United States Patent Office 2,917,561
Patented Dec. 15, 1959

2,917,561

PRODUCTION OF MESITYLENE

Lawrence T. Eby, Linden, N.J., assignor to Esso Research and Engineering Company, a corporation of Delaware No Drawing. Application February 17, 1958
Serial No. 715,481

6 Claims. (Cl. 260—668)

The present invention relates to an improved process for the preparation of mesitylene by vapor phase reaction in the presence of a novel catalyst for this purpose. Mesitylene is a well-known valuable chemical compound having various known uses such as an intermediate for the production of plasticizers.

Several techniques for the production of mesitylene from relatively inexpensive acetone are known. These include, for example, a condensation-dehydration type reaction employing sulfuric acid, liquid phase synthesis employing certain dehydration catalysts, and other techniques employing acidic condensing agents such as hydrochloric acid. The use of acid, aside from effecting extremely low yields of perhaps 15 to 20% of the theoretical, also has many drawbacks especially with regard to corrosion problems.

It has now been found that mesitylene can be produced from acetone by a vapor phase reaction over a tantalum catalyst with exceptionally high selectivity which under the most preferred conditions is about 100%.

In accordance with this invention acetone vapors at 200–500° C. are contacted with a catalyst comprising tantalum preferably on a support. As the support for the tantalum there may be used silica-alumina, alumina, kieselguhr, pumice stone, carbon, etc., but silica is preferred. By the term "tantalum" it is meant to include elemental tantalum as well as various oxides, e.g. tantalum pentoxide, salts and other compounds thereof. If it is desired to activate the catalyst, it may be air blown at elevated temperatures such as 150 to 600° C. for a period of 1 to 10 or more hours or activation can be effected in situ under reaction conditions. The amount of tantalum catalyst on the support will preferably range from about .05 to 5 wt. percent, although ratios beyond these ranges may be employed, if desired. The catalyst particle size may be varied considerably, e.g. pea size, to fluidizable particles, e.g. 50–100 microns.

The novelty in this invention does not relate to the particular physical properties of the catalyst employed since this type of catalyst is known to the art; however, the catalytic component tantalum may be present as a surface coating or impregnated in the support by any conventional technique. Accordingly, in a preferred embodiment acetone vapors preheated to the aforementioned temperatures are passed through a tube-type reactor filled or partially filled with the supported tantalum catalyst preferably having been activated with air at reaction temperatures to provide a contact time of from 1 to 20 seconds. It is, however, within the purview of this invention to depart from this illustrative range. It is to be understood that other type reactors may be employed, the essential features of the invention being vapor phase reaction in contact with the supported tantalum catalyst at temperatures of 200 to 500° C. Pressures employable may range from 0.05 to 200 atmospheres or higher. When operating under preferred conditions of 300 to 400° C. with 1 to 3% tantala on silica gel, the converted product will comprise substantially 100% mesitylene unconverted acetone is of course easily separated from mesitylene by any conventional technique since their boiling points differ considerably. When operating outside of the preferred ranges, small amounts of mesityl oxide may be produced along with the mesitylene. Mesityl oxide boiling some 33° lower than mesitylene is separated from the product with ease by simple distillation.

The following examples show the extremely high selectivities obtained when operating in accordance with this invention.

*Example 1*

Tantalum oxalate on silica gel was activated in a stainless steel tube with air for 3 hours at 300° C. to produce 2 wt. percent tantalum pentoxide on silica. The catalyst employed was in the form of pellets of approximately ⅛ to ¼ inch in diameter. After activation, acetone vapors at atmospheric pressures were passed through the reactor tube at 0.7 v./v./hr. and 210° C. The product recovered was analyzed and found to contain mesitylene and mesityl oxide with a selectivity of about 52% to mesitylene.

*Example 2*

Example 1 was repeated at slightly higher temperatures of 255° C. with a throughput rate of 0.8 v./v./hr. resulting in approximately 95% selectivity to mesitylene, the remainder being mesityl oxide.

*Example 3*

The reaction of Example 1 was repeated at 300° C. at 1 v./v./hr. resulting in a 47% conversion with recovery of about 96 parts of mesitylene per 4 parts of mesityl oxide.

*Example 4*

The experiment of Example 1 was carried out at 350° C. with 0.7 v./v./hr. with a conversion of 62% and a selectivity to mesitylene of 100%.

*Example 5*

The experiment of Example 1 was carried out at 400° C. with 0.8 v./v./hr. with a conversion of 60% and a selectivity to mesitylene of about 99%.

*Example 6*

Example 1 is repeated employing 1% tanala on silica-alumina at 450° C. to provide a conversion of about 58% and a selectivity of about 95%.

In the above examples v./v./hr. represents volumes of acetone calculated as liquid per volume of reactor space per hour.

While only tantalum has been disclosed to be highly effective for the selective conversion of acetone to mesitylene, it is to be understood that other co-catalysts, modifiers or activators may be employed in conjunction therewith. It is intended that the scope of this invention include tantalum comprising catalysts with or without a support, modifier, activator and the like. Although, as shown in the examples, the selectivity to mesitylene is 100% under preferred conditions, in some cases it may be desirable to add a modifying agent or co-catalyst to increase the conversion level at the aforesaid temperatures or to permit high conversions at lower temperatures. For example, known catalysts for the conversion of acetone to mesitylene include iron, cobalt, nickel and tungsten, and these may be employed together with the tantalum, if desired. Other catalysts suitable as modifying agents includes those disclosed in U.S. 2,429,361.

What is claimed is:

1. A method for the preparation of mesitylene which comprises contacting acetone vapors with a catalyst comprising tantalum at temperatures between 200 and 500° C.

2. A method for producing mesitylene which comprises passing acetone vapors through a reaction zone containing a supported tantalum catalyst at temperatures of 200–500° C.

3. A method in accordance with claim 2 wherein said support is selected from the group consisting of silica, alumina, silica-alumina, kieselguhr and pumice stone, and tantalum is present in an amount between 0.5 and 5 wt. percent based on said support.

4. A method in accordance with claim 3 wherein said catalyst is first activated with air at elevated temperatures.

5. A process for preparing mesitylene which comprises contacting vaporous acetone with a catalyst comprising 0.5–5 wt. percent tantalum on silica gel at a temperature between 300 to 400° C.

6. A method for producing mesitylene which comprises passing acetone vapors through a reaction zone containing a supported tantalum pentoxide catalyst at temperatures of 200–500° C.

References Cited in the file of this patent

UNITED STATES PATENTS

| | | |
|---|---|---|
| 2,272,266 | Grosse et al. | Feb. 10, 1942 |
| 2,419,142 | Ipatieff et al. | Apr. 15, 1947 |
| 2,420,143 | Mattox | May 6, 1947 |
| 2,425,096 | Ipatieff et al. | Aug. 5, 1947 |
| 2,429,361 | Linn et al. | Oct. 21, 1947 |
| 2,443,732 | Ipatieff et al. | June 22, 1948 |
| 2,711,420 | Brown et al. | June 21, 1955 |